United States Patent [19]

Duffer et al.

[11] Patent Number: 4,530,889
[45] Date of Patent: Jul. 23, 1985

[54] ACIDIFIED POWDERED INTERLEAVING

[75] Inventors: Paul F. Duffer, Creighton; Helmut Franz, Pittsburgh; Joseph D. Kelly, Chewick, all of Pa.

[73] Assignee: PPG Industries, Inc., Pittsburgh, Pa.

[21] Appl. No.: 229,208

[22] Filed: Jan. 28, 1981

[51] Int. Cl.³ .................... B32B 23/00; B32B 17/08; B32B 15/00
[52] U.S. Cl. ........................................ 428/326; 65/24; 252/11; 428/432; 428/438; 427/384
[58] Field of Search ....................... 427/384, 189, 154; 428/432, 426, 438, 326; 252/11, 384; 65/24

[56] References Cited

U.S. PATENT DOCUMENTS

| 3,723,312 | 3/1973 | Hay, Jr. | 252/11 |
| 4,011,359 | 3/1977 | Simpkin et al. | 428/326 |
| 4,200,670 | 4/1980 | Albach | 427/154 |
| 4,263,371 | 4/1981 | Franz | 428/432 |

Primary Examiner—Michael R. Lusignan
Attorney, Agent, or Firm—Donna L. Seidel

[57] ABSTRACT

A method and composition utilizing porous particulate interleaving material treated with a strong organic acid are disclosed to reduce staining of stacked glass sheets.

9 Claims, No Drawings

ACIDIFIED POWDERED INTERLEAVING

BACKGROUND OF THE INVENTION

The present invention relates generally to the art of preventing staining of packed glass sheets and more particularly to the art of treating the glass sheets with powdered interleaving material.

U.S. Pat. No. 3,723,312 to Hay discloses the packaging of glass sheets separated by a mixture of dedusted agglomerated salicylic acid and an inert separator material such as polystyrene beads.

U.S. Pat. No. 4,011,359 to Simpkin et al discloses an interleaving material for separating glass sheets which comprises a porous finely divided support material impregnated with a weakly acidic material such as adipic acid, and slightly larger particles of a chemically inert plastic such as methyl methacrylate.

U.S. Pat. No. 4,200,670 to Albach describes a method of treating glass sheets to be stacked by applying water, a stain inhibiting material such as ammonium chloride, and dry particles of a mechanical separator such as wood flour in sequential steps.

U.S. Pat. No. 4,263,371 to Helmut Franz and entitled "Organotin Treatment for Reducing the Reactivity of a Glass Surface" discloses the chemisorption of an organotin compound by a glass surface with the tin-functional moiety bonding to the glass and the organic moiety oriented outward from the glass to provide a low energy surface layer.

SUMMARY OF THE INVENTION

The present invention involves an improved powdered interleaving material for inhibiting the staining of packaged glass sheets. The powdered interleaving material of the present invention comprises a porous, finely divided support material such as wood flour, impregnated with a strongly acidic organic compound.

DESCRIPTION OF THE PREFERRED EMBODIMENTS

A finely divided porous support material is impregnated with a strong organic acid in accordance with the present invention. Conventional porous particulate interleaving materials are preferably treated with a strong organic acid which is soluble in water and solid at ambient temperatures.

Although inert polymeric support materials may be used, as well as inorganic particulates such as vermiculite, preferred porous support materials are cellulose materials such as rice flour, ground coconut shell and wood flour, preferably conventional hardwood flour interleaving material.

Strong organic acids are characterized, for purposes of the present invention, as those having a pH less than about 3 when dissolved in water at a concentration of about one percent by weight. Preferred strong organic acids include citric, malic and tartaric acids. Particularly preferred organic acids are the strongly acidic water soluble organotin compounds, particularly organotin halides. Especially preferred strong organic acids, which typically have a pH less than 2.5 for a one percent aqueous solution, include alkyltin halides, especially methyltin chlorides such as methyltin trichloride, dimethyltin dichloride and mixtures thereof, which generally have a pH less than 2.

In a preferred embodiment of the present invention, a conventional porous particulate interleaving material is treated with an aqueous solution of a preferred organic acid and dried. The acid-impregnated interleaving material may be dispersed by any conventional technique between glass sheets to be stacked in a packaging arrangement. For example, the acid-treated interleaving may be dusted onto the glass surface using conventional application equipment. However, in a most preferred embodiment, the acidified powdered interleaving material is applied to the glass surfaces in the form of an aqueous slurry as described in U.S. application Ser. No. 229,220 filed by the same inventors on even date herewith entitled "Method of Applying Interleaving Material to Glass Sheets", the disclosure of which is incorporated herein by reference. This application technique results in stronger adhesion of the interleaving material to the glass surface, thereby minimizing loss or uneven distribution of interleaving material which typically occurs during handling of the glass sheets. The strongly acidic organic compounds used to treat interleaving material in accordance with the present invention provide improved protection from straining by neutralizing alkali buildup between stacked glass sheets.

In a most preferred embodiment of the present invention, wood flour interleaving material is treated with an aqueous solution of an alkyltin halide. Preferably, conventional wood flour interleaving material is dispersed in an aqueous solution of methyltin chloride for a sufficient time for the methyltin chloride to acidify the wood flour, typically a few minutes. The acid-impregnated wood flour may be filtered and dried, or simply dried, depending on the concentration and volume of the methyltin chloride solution. Acid treatment and drying may be accomplished at ambient or elevated temperatures.

The present invention will be further understood from the description of a specific example which follows.

EXAMPLE I

Wood flour interleaving material is contacted with an aqueous solution containing one percent by weight of a methyltin chloride composition. The wood flour is a 40 to 80 mesh hardwood product supplied by International Filler Corporation of New York. The methyltin chloride composition comprises 80 percent by weight dimethyltin dichloride and 20 percent by weight methyltin trichloride and is supplied as a 50 percent aqueous solution by Carstab Corporation of Reading, Ohio. The wood flour is soaked in the acid solution for about 5 to 10 minutes and then dried at ambient temperature. The methyltin chloride solution is strongly acidic, having a pH of 1.45. The acid-impregnated wood flour is then applied to the surfaces of glass sheets by conventional dusting techniques using commercially available powder application equipment. The treated glass sheets are stacked and tested for stain resistance by exposure to a temperature of 140° F. (about 60° C.) at 100 percent relative humidity. Stacked glass sheets separated by untreated wood flour interleaving material exhibit stain after only 7 days, whereas glass sheets separated by the methyltin chloride treated wood flour of this example are free from stain for at least 14 days.

The above example is offered to illustrate the improvement in stain resistance which is obtainable in accordance with the present invention. Modifications of the invention, such as the use of other strongly acidic organic materials, other interleaving materials, and various concentrations and quantities thereof, are included within the scope of the present invention, which is defined by the following claims.

We claim:

1. A composition of matter useful as an interleaving material for separating glass sheets and providing stain resistance to the glass surfaces, which composition comprises a porous powdered support material impregnated with a strong organic acid which is an organotin halide.

2. The composition according to claim 1, wherein the organotin halide is a alkyltin halide selected from the group consisting of methyltin trichloride, dimethyltin dichloride, trimethyltin chloride and mixtures thereof.

3. The composition according to claim 2, wherein the alkyltin halide comprises 80 percent dimethyltin dichloride and 20 percent methyltin trichloride.

4. A method for reducing the incidence of staining on the surface of stacked glass sheets comprising the steps of:
   a. impregnating a porous powdered interleaving material with a strong organic acid which is an organotin halide; and
   b. dispersing said acid treated interleaving material between said glass sheets prior to stacking.

5. The method according to claim 4, wherein the step of impregnating the interleaving material with the organotin halide is accomplished by contacting the interleaving material with an aqueous solution of the organotin halide.

6. The method according to claim 5, wherein the organic interleaving material is contacted with a volume of solution containing a quantity of organotin halide sufficient to provide stain reducing properties and the solution is dried in situ.

7. The method according to claim 5, wherein the interleaving material is
   a. contacted with the aqueous solution for a sufficient time to absorb a quantity of organotin halide sufficient to provide stain reducing properties;
   b. separated from the aqueous solution; and
   c. dried.

8. The method according to claim 4, wherein the organotin halide is an alkyltin halide.

9. The method according to claim 8, wherein the alkyltin halide is selected from the group consisting of methyltin trichloride, dimethyltin dichloride, trimethyltin chloride and mixtures thereof.

* * * * *